United States Patent Office 3,661,979
Patented May 9, 1972

3,661,979
PROCESS FOR PREPARING METHYL HEXADIENOATES
Mario Dubini, Novara, and Franco Montino, Casale Monferrato, Alessandria, Italy, assignors to Montecatini Edison S.p.A., Milan, Italy
No Drawing. Filed Apr. 1, 1969, Ser. No. 816,152
Claims priority, application Italy, Apr. 3, 1968, 14,760/68
Int. Cl. C07c 69/52
U.S. Cl. 260—486 AC     5 Claims

ABSTRACT OF THE DISCLOSURE

A process for preparing methyl 2,5-hexadienoate starting from allyl chloride, acetylene, carbon oxide and methanol. The process is characterized in that a catalyst is prepared from carbonyl nickel, thiourea and allyl chloride in methanol. The catalyst is then made to react with allyl chloride, acetylene and carbon oxide at a pH value between 4 and 6.

---

The present invention relates to a process for preparing unsaturated alpha-beta and delta-epsilon esters, more particularly methyl 2,5-hexadienoate.

It is known that it is possible to obtain unsaturated alpha-beta and delta-epsilon (2,5-dienoic) esters from alkyl halides by reaction with acetylene and carbon monoxide in alkanol, in the presence of nickel-based catalysts.

In particular, the reaction for methyl 2,5-hexadienoate is:

(I) 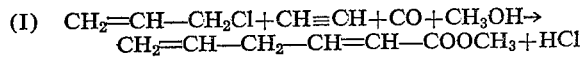
$$CH_2=CH-CH_2Cl+CH\equiv CH+CO+CH_3OH \rightarrow$$
$$CH_2=CH-CH_2-CH=CH-COOCH_3+HCl$$

Carbonyl nickel in excess is used as the catalytic system. At the end of the reaction, most of the carbonyl nickel is recovered unaltered. This system requires, however, a considerable consumption of carbonyl nickel and the yield in methyl 2,5-hexadienoate is rather modest with respect to the allyl chloride when in concentrated solutions.

In a subsequent improvement (Italian Pat. No. 760,-135) a new catalytic system based on nickel chloride, thiourea and manganese or a ferromanganese alloy is described. With this system, good yields (around 75%) of methyl 2,5-hexadienoate are obtained from allyl chloride. The recovery of the nickel salts at the end of the reaction is, however, hindered by the presence of metal ions, different from the nickel, such as iron and manganese ions.

Finally, there is a catalyst system of allyl (bis-thiourea) nickel chloride complex for the reaction (I). According to that process, however, the catalyst requires separate preparation.

We have surprisingly found, and this forms the object of this invention, that it is possible to improve the reaction by preparing beforehand, in situ, a catalyst starting from carbonyl nickel, thiourea and allyl chloride in an alkanol, preferably methanol, and by then permitting reaction (I) to occur at a pH value comprised between 4 and 6, but preferably between 4.5 and 5. The pH is maintained preferably constant by neutralizing the acidity with an alkali soluble in methanol, such as ammonia, sodium hydroxide, potassium hydroxide. In this way the reaction occurs in a homogeneous phase. The pH range within which the reaction is maintained, has a great influence on the yield in methyl hexadienoate, on the reaction rate and thus on the quantity of Ni(CO)$_4$ used during the test.

One operates at atmospheric pressure, at a temperature comprised between 15° and 35° C., but preferably at 26–27° C., by feeding the acetylene and the carbon oxide in equimolar ratios. Reaction times of from 2 to 6 hours are quite sufficient. For 1 mole of allyl chloride (C$_3$H$_5$Cl) at least 5 moles of methanol and from 0.01 to 0.1 mole of carbonyl nickel are used. The thiourea, with respect to the nickel, is used in molar ratios comprised between 0.5:1 to 5:1, but in general between about 1.3 and 1. In order to reduce the quantity of Ni(CO)$_4$ and for maintaining a uniform reaction rate, it is convenient, though not essential, to feed nickel in small batches during the course of the reaction.

At the end of the run, it is very easy to recover the nickel, due to the absence of salts of metal different from nickel.

This invention permits the following advantages over the known methods:

greater yields in methyl 2,5-hexadienoate;
a higher productivity;
an appreciable reduction of the quantity of Ni(CO)$_4$ used, and easier recovery of the nickel at the end of the reaction, for instance by reconversion into Ni(CO)$_4$ by means of iron powder in a CO current;
ease of designing and operation of an industrial plant, since one operates in a homogeneous phase.

The following examples are given for purely illustrative and not limiting purposes.

EXAMPLE 1

The apparatus consisted of a 5-necked 5 liter flask fitted with a thermometer and provided with a mechanical stirrer, reflux condenser cooled by liquid ammonia, dipping pipe for the feeding in of the gaseous mixture, which is recycled through a pump from a compensating storage tank, dipping funnels for the feeding of the reactants and glass electrode for measuring the pH.

Into the flask, after previous washing with CO, were introduced 750 ml. of CH$_3$OH, 120 g. of allyl chloride at 98%, 275 g. of thiourea (36.2 mM), and finally 4.6 g. of carbonyl nickel (27 mM). After 5 minutes of stirring, during which there was observed a red-orange coloring and the development of gas, the gaseous mixture was made to bubble through the solution.

Since the gases were recycled, the gaseous mixture contained in the compensation tank must be richer in C$_2$H$_2$ in order to compensate the CO contained in the flask, and the absorption of the acetylene in the methanol, so that at running conditions the mixture be constituted by CO:C$_2$H$_2$=1:1. The temperature, which tends to rise, was maintained at 27° C. by a bath of water and ice, while the pH value was maintained at 6-7 by slow dropping of alkaline solution, until there was attained an absorption of about 3 liters of gas, which are necessary for saturating the solution. From this moment, the pH was maintained at a value comprised between 4.5 and 5, by means of methanol saturated with NH$_3$, while the temperature was maintained at 27° C., either by cooling down or heating up. After 10 minutes, 0.3 g. thiourea in 4 ml. of methanol were added. After one hour, the absorption speed tended to slow down. At this point a catalyst solution was fed in, which had been prepared in a dipping funnel kept under CO. This solution consisted of: 50 ml. of methanol, 2.6 g. of $Ni(CO)_4$, 1.2 g. of thiourea, 2.5 g. of allylchloride at 98%.

The solution was maintained under CO (red coloring and development of gases) for 5 minutes, optionally under stirring, and was then dripped into the flask in about 2 minutes. After possible small desorption of gas, a lively pickup of the reaction was noted. 10 minutes after the addition of the catalyst, there was fed in 0.3 g. of thiourea in 4 ml. of methanol. One hour later, a further charged of catalyst like the previoius one was fed in, followed after 10 minutes by the addition of 0.3 g. of thiourea in methanol. After one and one-half hours, another catalyst was introduced consisting of: 50 ml. of methanol, 1.3 g. of $Ni(CO)_4$, 0.6 g. of thiourea, 1.3 g. of allyl chloride. After further 10 minutes, 0.3 g. of thiourea in methanol were added. After 5 hours and 20 minutes from the start, when the volumes of absorbed gases corresponded almost to the calculated theoretical value, the absorption stopped.

After filtering off the ammonium chloride, there were obtained by distillation up to 65° C. and by successive azeotropic distillation with water:

|  | G. |
|---|---|
| Allyl chloride | 0.1 |
| Hexadiene | 3.37 |
| Methyl vinylacetate | 7.82 |
| Mixture of methyl 2,5-hexadienoate with small quantities of its isomers (yield 77% with respect to the chloride) | 155.8 |

The residue (13.4 g.), extracted with $CHCl_3$ and subjected to distillation under vacuum, consisted of 80% of cyclopentenone-acetate of methyl. The total consumption of catalyst amounted to 11 g. of $Ni(CO)_4$ and 6.95 g. of thiourea.

EXAMPLE 2

The run was conducted following the same procedures as those of Example 1, except that a methanol solution of NaOH (at about 20%) was used for controlling the pH. 30 minutes after the start of the reaction there were added 0.3 g. of thiourea. 30 minutes later, a dose of catalyst consisting of: 50 ml. of methanol, 1.3 g. of $Ni(CO)_4$, 0.6 g. of thiourea, 1.3 g. of allyl chloride, was added. Some 50 minutes later, 0.3 g. of thiourea, followed by another dose of catalyst 30 minutes later, which was followed by 0.3 g. of thiourea 40 minutes later, were added. Then, after 1 hour and 20 minutes a further quantity of catalyst (same quantity as before) was added, followed 40 minutes later by another half dose of catalyst as before. 20 minutes later, another further 0.3 g. of thiourea were added. In 6 hours about 80% of the theoretical volume of gas had been absorbed. By distillation, the following substances were found:

|  | G. |
|---|---|
| Unreacted allyl chloride (conversion 80%) | 26 |
| Hexadiene | 2.2 |
| Methyl vinylacetate | 1.4 |
| Residue | 19.2 |
| Cis-methyl 2,5-hexadienoate (70.05% with respect to the converted chloride) | 118.1 |

EXAMPLE 3

In the same apparatus of Example 1, and following the same procedures, other runs were carried out at various pH values which are summarized in the following table:

| Run | a | b | c | d | e |
|---|---|---|---|---|---|
| Testing conditions: | | | | | |
| Range of pH values | 4–4.5 | 4.5–5 | | 5.5–6 | |
| $Ni(CO)_4/C_3H_5Cl$ M/100 M | 6.18 | 4 | 4 | 3.62 | 3.62 |
| Thiourea/$C_3H_5Cl$ M/100 M | 6.65 | 5.67 | 5.67 | 4.95 | 4.95 |
| Reaction time (hours) | 5 | 5 hrs.–20 min. | | 4 hrs.–30 min. | |
| Results of test (percent): | | | | | |
| Conversion of $C_3H_5Cl$ | 99.3 | 100 | 96.2 | 99.5 | 99.5 |
| Yield in methyl 2,5-hexadienoate on the converted $C_3H_5Cl$ | 74.8 | 77 | 76.2 | 68.2 | 67.2 |
| Yield in 1,5-hexadiene | 5.93 | 5.65 | 5.23 | 3.27 | 3.78 |
| Yield in methyl vinyl-acetate | 2.66 | 4.85 | 4.85 | 6.55 | 8.9 |
| Yield in high boiling products with B.P. >60° C./13 torr (with average m.w. 154) | 5.4 | 5.4 | 5.4 | 10 | 9.4 |

NOTE.—Test b is the one described in Example 1.

As is evidenced by the table, the optimum pH is equal to 4.5–5; in fact, the lower pH values require greater quantities of catalyst in order to attain the same conversions of allyl chloride with lower yields of hexadienoate; the higher pH values favor the formation of methyl vinylacetate and products of higher molecular weight (methyl cyclopentenonacetates), even if the consumption of catalyst may be slightly reduced.

We claim:
1. In a process for preparing methyl 2,5-hexadienoate from allyl chloride, acetylene, carbon oxide and methanol in the presence of nickel-based catalysts, the improvement which comprises reacting allyl chloride, acetylene and carbon monoxide in the presence of a catalyst prepared by dissolving carbonyl nickel, thiourea and allyl chloride in methanol wherein per 1 mole of allyl chloride from 0.01 to 0.1 mole of carbonyl nickel and from 0.5 to 5 moles of thiourea per 1 mole of carbonyl nickel are used, and maintaining the pH reaction values between 4 and 6 by methanol soluble alkali selected from ammonia, sodium hydroxide and potassium hydroxide.

2. The process of claim 1, wherein the pH is maintained between 4.5 and 5.

3. The process of claim 1, wherein the reaction is at atmospheric pressure and a temperature from 15° to 35° C.

4. The process of claim 1, wherein the temperature is from 26° to 27° C.

5. The process of claim 1, wherein the reactants are added to the freshly prepared catalyst solution.

References Cited

UNITED STATES PATENTS 3,312,731    4/1967    Chiusoli et al. _____ 260—484 X

FOREIGN PATENTS 709,855    5/1965    Canada _____ 260—484

LORRAINE A. WEINBERGER, Primary Examiner

P. J. KILLOS, Assistant Examiner

U.S. Cl. X.R.

252—431 N